United States Patent [19]
Carthew

[11] 3,917,444
[45] Nov. 4, 1975

[54] HEAT RECOVERY SYSTEMS
[75] Inventor: Maximilian Kurt Carthew, Maidstone, England
[73] Assignee: Carrier Drysys Ltd., Warwick Row London, England
[22] Filed: Oct. 2, 1973
[21] Appl. No.: 402,849

Related U.S. Application Data
[63] Continuation-in-part of Ser. No. 142,469, May 12, 1971, abandoned.

[30] Foreign Application Priority Data
May 15, 1970 United Kingdom............... 23796/70

[52] U.S. Cl. .......................... 432/72; 34/35; 34/26; 432/29; 34/59; 23/277 C; 23/288 F; 432/49
[51] Int. Cl.²..... F26B 5/00; B01J 6/00; F23J 17/00
[58] Field of Search ............... 34/35, 26, 86, 34, 54, 34/79, DIG. 7; 432/29, 14, 17, 38, 39, 48-49, 72, 222, 223; 23/288 F, 277 C, 288 E; 165/36; 236/13

[56] References Cited
UNITED STATES PATENTS

| | | | |
|---|---|---|---|
| 2,880,752 | 4/1959 | Kreuttner | 236/13 X |
| 2,957,629 | 10/1960 | Curran | 236/13 |
| 3,034,725 | 5/1962 | Person | 236/13 |
| 3,116,016 | 12/1963 | Joesting | 236/13 |
| 3,610,522 | 10/1971 | Tutt | 236/13 |

Primary Examiner—John J. Camby
Assistant Examiner—Henry C. Yuen
Attorney, Agent, or Firm—Snyder, Brown & Ramik

[57] ABSTRACT

A heat recovery system for an industrial process producing a gaseous effluent as a by-product has a direct-fired combustion chamber for the effluent which is supplied by ducting from the process. The burnt gas from the combustion chamber is carried by ducting to a heat exchanger where it is either mixed with fresh air or used to heat fresh air directly. Ducting carries the heated air or air/burnt gas mixture to a number of separate heating zones in the process, and the supply duct for each zone is provided with temperature control means for either heating or cooling the gas in the duct whilst maintaining a constant weight of gas passing through the duct.

9 Claims, 10 Drawing Figures

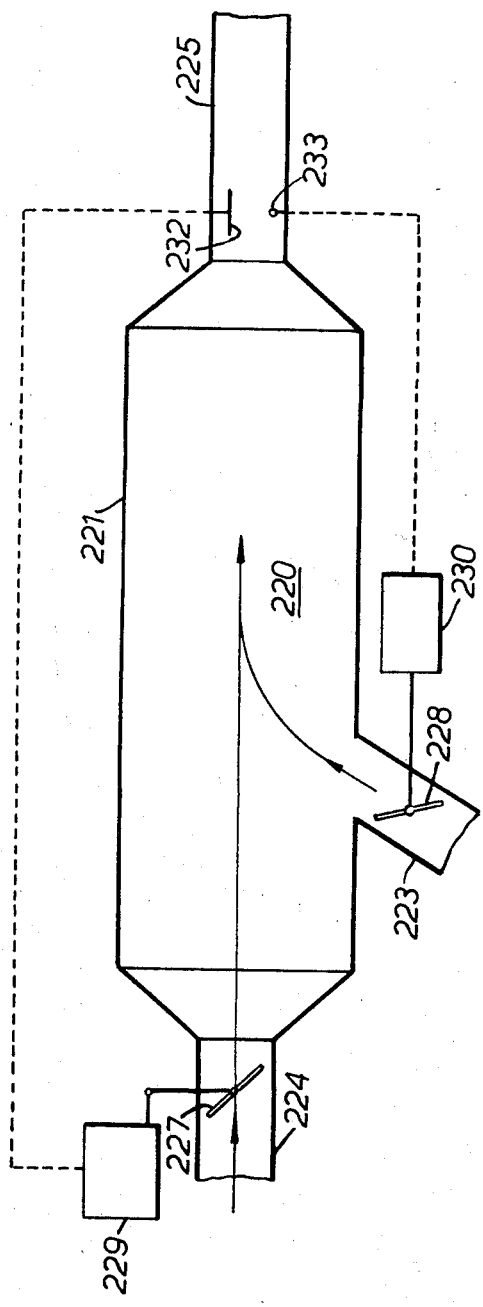

HEAT RECOVERY SYSTEMS

CROSS REFERENCES TO RELATED APPLICATIONS

This application is a continuation-in-part of my copending application Ser. No. 142,469 filed May 12, 1971 now abandoned.

BACKGROUND OF THE INVENTION

1. Field of the Invention

The invention relates to heat recovery systems for use in industrial processes which produce a combustible gaseous effluent as a by-product. Examples of such industrial processes are industrial furnaces and ovens used in metal and like surface finishing plants in the painting or anti-corrosive treatment of articles. The invention also relates to methods of recovering heat from such processes.

2. Description of the Prior Art

Many industrial processes produce in operation a combustible gaseous effluent. Such effluent often includes odiferous and poisonous components and as a result of anti-pollution legislation requires treatment before it is discharged into the atmosphere.

A common method of treating such effluent is to pass the effluent through a combustion chamber, where the noxious fumes are burnt and rendered suitable for discharge into the atmosphere. As many of these processes require a source of heated gas for their operation, it has been proposed to utilise the products of combustion of the incinerator and recycle the burnt gas back to the industrial process.

To date however, such known heat recovery systems have been somewhat crude in their conception and while they have been satisfactory for some processes they are unsuitable for processes which have varying heat load requirements, which require fine temperature and/or mass control of the gas, and which may require varying quantities of heat to be introduced into two or more heating zones.

This is due to a combination of factors, mainly economic and constructional; for example, due to the high thermal losses associated with hot gases, it has been found uneconomic to carry hot air or gas to a number of heating zones or users, and accordingly the recovered heat in known processes has generally been fed back to one primary user on a closed loop system. In addition, many prior art systems have relied on indirect heat exchangers for heating air, and these are unsuitable for supplying numerous heating zones as they are expensive to produce and to install due to their complex controls and ducting. Sufficiently fine temperature control without alteration of the weight of hot gas in the system has not been possible. Although it has been known to convert the heat from burnt gaseous effluent into steam, a flexible system has not been achieved utilising hot gases.

It is an object of the invention to provide a heat recovery system which utilises the waste heat produced in an industrial process more efficiently and more effectively than in known systems.

It is a further object of the invention to provide a heat recovery system which allows the sharing of heat with two or more heating zones or users with individual temperature control for each user.

It is a further object of the invention to provide a heat recovery system which avoids the use of indirect heat exchangers at each heating zone and which provides instead simple and economic air blenders or burners for temperature control.

SUMMARY

According to the present invention, a heat recovery system for an industrial process which produces a combustible gaseous effluent as a by-product, comprises a combustion chamber, an inlet duct leading into the combustion chamber for the gaseous effluent, a fan for causing the effluent to flow through the combustion chamber and over the direct ignition device, an exhaust duct leading out of the combustion chamber for the burnt effluent, a first heat exchanger in communication with the exhaust duct and in which at least part of the burnt effluent is passed in heat exchange relationship with air, at least two supply ducts in communication with the first heat exchanger for supplying heated gas therefrom to a corresponding number of heating zones in the industrial process, and temperature control means located across each supply duct and adapted to individually control the temperature of the heated gas in the respective ducts whilst maintaining a constant weight of heated gas passing through each duct into the heating zones.

The temperature control means for the heated gas may comprise an air mixing box having walls defining a chamber, a gas inlet in the chamber communicating with the supply duct, a damper located in the gas inlet and adapted to control the flow of heated gas into the chamber, a gas outlet from the chamber communicating with the respective heating zone, a fresh air inlet in the chamber, ducting communicating with the fresh air inlet, a fan in the ducting operable to draw fresh air at ambient temperature into the chamber for mixing with the heated gas, and a damper located in the ducting and adapted to control the flow of fresh air into the chamber.

Alternatively, the temperature control means for the heated gas may comprise a terminal reheater having walls defining a heating chamber, a gas inlet in the heating chamber communicating with the supply duct, a gas outlet from the chamber communicating with the respective heating zone, and a burner located in the chamber and operable to supply heat to the gas passing through the chamber to the heating zone.

The above-described temperature control means fulfil an essential function of the system according to the invention by providing a variable quantity of heat for each heating zone while maintaining the air or hot gas balance of the process i.e. whilst maintaining a constant weight of hot gas flowing to the process. This is essential with some processes, e.g. paint bake ovens, in which it is essential to maintain the process air balance to avoid spillage of fumes from the entry and exit side of the process.

The invention also includes a method of recovering heat from an industrial process utilising such a heat recovery system.

BRIEF DESCRIPTION OF THE DRAWINGS

FIG. 10 is a diagrammatic sectional view of an air mixing box for use in a heat recovery system according to the invention.

DESCRIPTION OF THE PREFERRED EMBODIMENTS

Figure 1:
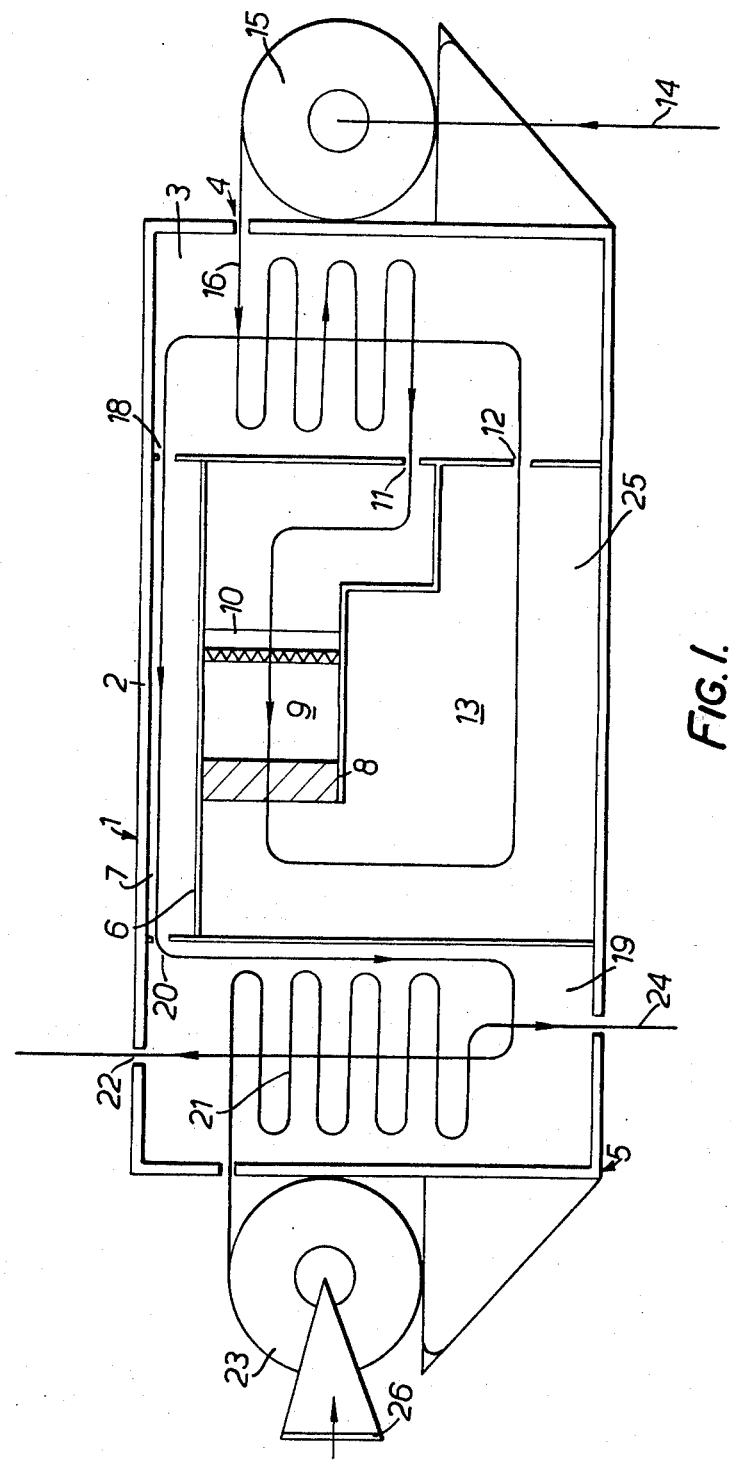
FIG. 1 is a diagrammatic sectional view of an effluent incinerator module for use in a heat recovery system according to the invention.
Figure 2:
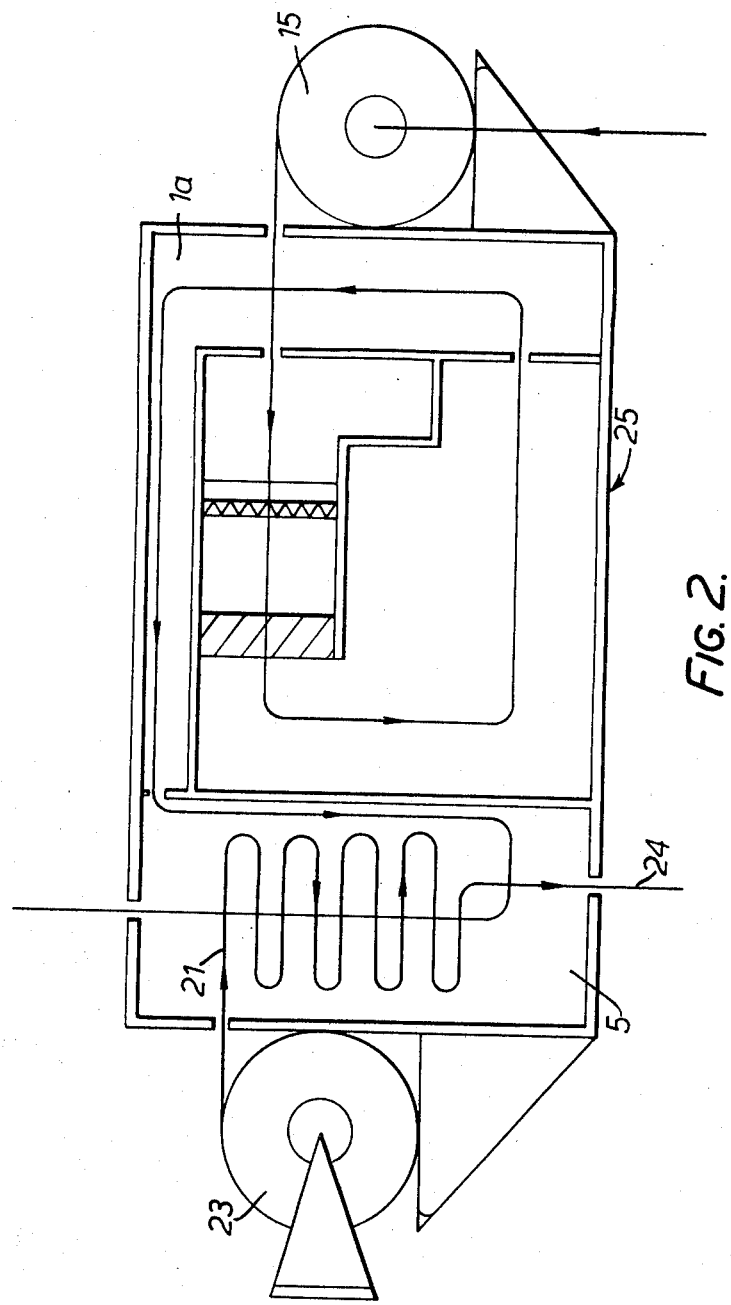
FIG. 2 is a diagrammatic sectional view of another effluent incinerator module for use in a heat recovery system according to the invention.

Referring to the drawings, FIGS. 1 and 2 show direct gas fired fume incinerators modules for use in a heat recovery system according to the invention. In FIG. 1, the incinerator module 1 has an insulated shell 2 defining a chamber 3 for an effluent preheater generally indicated at 4, and a chamber 19 forming an enclosure for a heat exchange device generally indicated at 5 for heating fresh air from a suitable source such as the atmosphere, for subsequent introduction into for example a drying oven or similar plant.

The combustion area is divided by an upper horizontal partition 6 to form a duct 7, and is further divided horizontally by a partition 8 into a combustion chamber 9 containing a direct gas fired burner 10 and having an effluent inlet 11 from the preheat heat exchanger 4, and an outlet 12 from the lower chamber 13 of the combustion area.

The gaseous effluent from the industrial process is drawn through a duct 14 by a fan 15, the impeller of which is located in the duct. The outlet from the fan casing or the duct containing the fan passes through the closed circuit of an indirect heat exchanger 16 located in the chamber 3 and then enters the combustion chamber 9 through the inlet 11.

The effluent entering the combustion chamber 9 passes over the direct ignition device 10 where the combustible constituent of the effluents are burnt and the odoriferous materials are burnt or transformed into non-odoriferous material. The exhausts from the burner, including the transformed effluent pass around the end of the compartment 8, into the lower chamber 13 and pass out of the aperture 12 into the chamber 3 where they flow in indirect heat exchange relationship with the incoming effluent passing through the heat exchanger 16, to pass out of the chamber 3 through an aperture 18 into the duct 7. This effectively preheats the incoming effluent to provide more efficient burning.

In this embodiment an indirect heat exchange device 5 is employed for the recycling of heated air back to the process; this device includes a chamber 19 having an inlet 20 through which the burnt gaseous effluent flowing in the duct 7 enters, and a heat exchanger 21. The burnt effluent flows in heat exchange relationship with the air in the heat exchanger 21 and passes out of the chamber 19 through an aperture 22 to exhaust.

The heat exchanger 21 receives an intake of fresh air for use in the heat recovery system and for subsequent introduction into the industrial process. The fresh air is forced by a fan 23, which may be similar to the fan 15, through the heat exchanger 21 and thence through the duct 24 leaving the chamber 19. It is then transferred to the industrial process, which may be for example a metal painting plant.

An alternative arrangement is shown in FIG. 2, where no effluent pre-heater is provided and in which the combustion area 25 is used in conjunction with the fresh air heat exchange device 5 alone. The incinerated effluent from the combustion chamber passes through a modified transfer duct 1a into the heat exchange device 5 and then to atmosphere via a stack (not shown). A fan 23, which may be similar to fan 15, forces the supply of fresh air through the heat exchanger 21 and thence into the system via the duct 24.

With regard to the operating conditions of these incinerator modules, in the example shown in FIG. 1 the temperature of the effluent flowing through the pipe 14 is at about 350°F while the temperature in the compartment 9 of the combustion chamber is about 1200° to 1500°F; the temperature of the effluent in the duct 16 is increased to about 775°F before entering the chamber 9 through the inlet 11. After transferring heat to the effluent in the heat exchanger 16 in the chamber 3, the temperature of the effluent flowing through the duct 7 is reduced to about 775°F and thus enters the chamber 19 at about 775°F whence it passes heat to the gaseous medium in the heat exchanger 21, raising that to about 350°F and leaving the stack at about 450°F.

It will be seen that in the apparatus of the invention, it is possible to minimise the amount of fuel burnt by the ignition device 10 by utilising the waste heat in the exhaust gases from the chamber 25 to preheat the effluent before it is acted on by the ignition device 10 and to preheat the gas flowing to the oven or other plant.

The combustion chamber itself is designed to operate at a sufficiently high temperature for the requisite "dwell time" of the effluent therein through its passage therethrough to minimise the escape of the effluent compounds and in particular to remove odours and all toxic elements from the exhaust gases.

The combustion chamber is preferably made from an alloy steel which will withstand the conditions arising from the gas combustion with or without a lining. Adequate access means for cleaning such as removable doors and covers are provided in the combustion chamber and the heat exchange chambers. Such access provides for simple servicing of the interior of the chambers.

For the aforesaid examples of temperature of the gaseous medium flowing through the various duct chambers, the combustion chamber length would be calculated to give a suitable "dwell time".

Such a dwell time would be 0.25 to 1.0 second, preferably 0.5 to 0.75 second, with a gas velocity of 5 to 25 feet per second, preferably 10 to 20 feet per second. In the example given with a "dwell time" of 0.74 second and a gas velocity of 20 feet per second, the length of the combustion chamber is 15 feet.

The heat exchange chamber 4 is designed to minimise blockages or sealing of the exchange surface by oven effluent which will be present during the preheat cycle. One of both of the heat exchange chambers may be detachable from the combustion chamber so that they can be separated for servicing and assembled for operation. In the aforesaid example of the temperatures in the cycles the chamber 4 represents a heat transfer duty of $4.25 \times 10^6$ BTU/HR when handling an exhaust quantity of about 9,170 standard cubic feet per minute (SCFM). The temperature drop across the exchanger on the hot gas side is nominally from 1200°F to 775°F with a flow of 9,170 SCFM.

The heat exchange device 5 for use in the aforesaid example of temperatures in the combustion chamber is designed to have a heat transfer from the exhaust gases to fresh air from the atmosphere flowing through the duct 21 raising its temperature from 70°F to 350°F when handling 10,470 SCFM of fresh air. This represents a duty of $3.16 \times 10^6$ BTU/HR and the temperature drop across the exchanger on the hot gas side is from 755°F to 455°F handling the exhaust gas quantity of 9,170 SCFM.

Suitable thermo-couples or like devices are provided in the chambers connected to appropriate controls and to the supply of electric current to the fan motors to enable adequate control of the whole system to be maintained in use. Further controls would be included to ensure the required gas supply temperature to the oven or other plant is maintained.

Provision may be made to purge the incinerator equipment and to ensure the required surface temperatures within the incinerator prior to start-up and during any stoppage.

A sampling device or similar apparatus is preferably included in the exhaust stack equipment to measure and/or record the efficiency of the incineration process. It can be established that the efficiency of this apparatus is about 85% ignoring heat release from the paint combustibles contained in the exhaust air.

Figure 3:
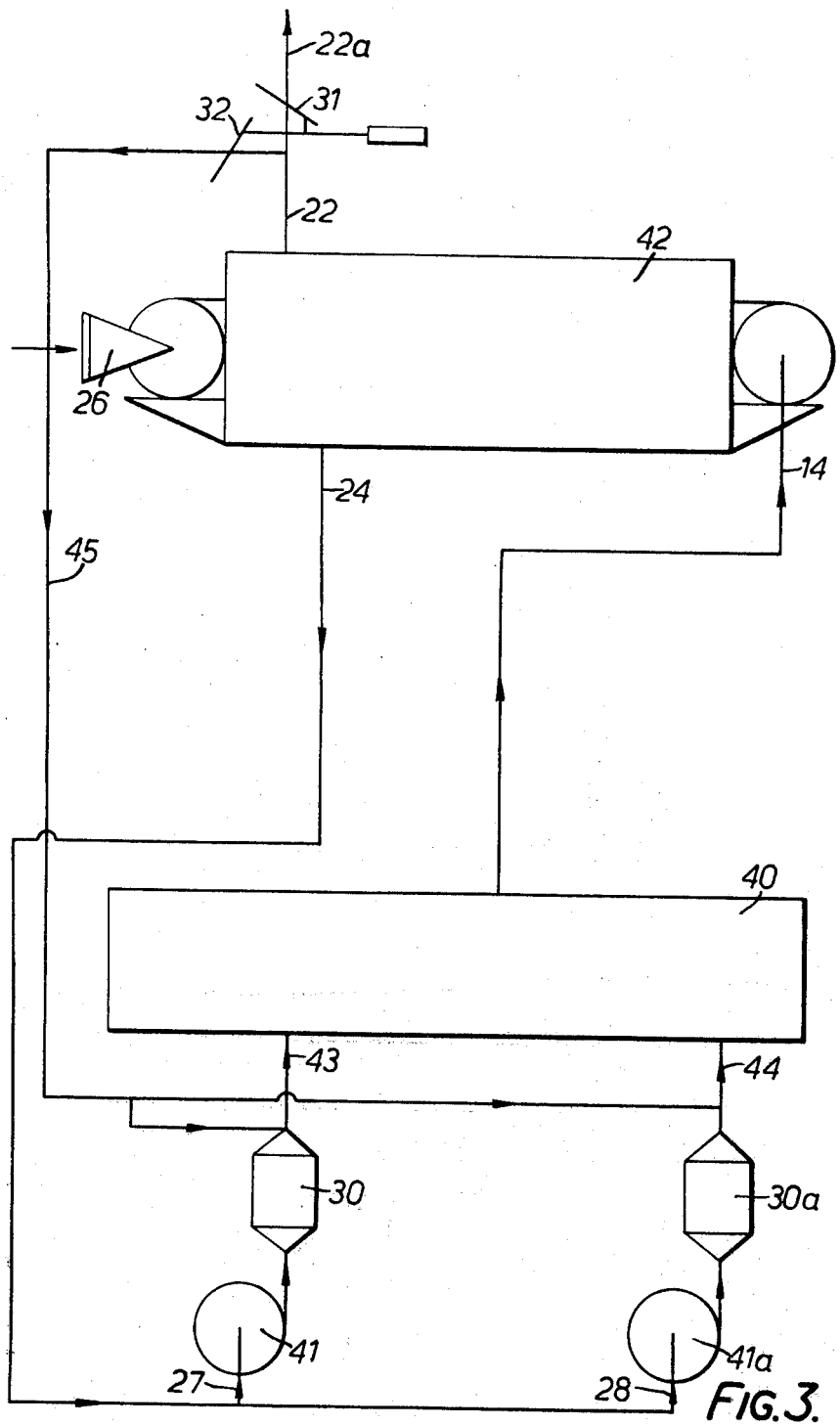
FIG. 3, FIG. 4, FIG. 5, FIG. 6, FIG. 7, and FIG. 8 are diagrammatic line drawings of heat recovery systems constructed in accordance with the invention.

Referring to FIG. 3, this shows a heat recovery system according to the invention utilising an incinerator module similar to that described in FIG. 1 and adapted to supply a hot air/gas mixture to a paint bake oven 40. In this system, the preheated fresh air from the exhaust duct 24 passes directly to the inlet ducts 27 and 28 of two terminal reheaters 30 and 30a provided with intake fans 41 and 41a respectively. The heated air is blown through the heaters 30 and 30a by the intake fans and into two heating zones in the oven 40 via inlet ducts 43 and 44 respectively. The temperature of the air passing through the ducts 43 and 44 may be controlled individually by the heaters 30 and 30a without altering the air balance of the system.

The combustible gaseous effluent from the oven 40 is discharged through duct 14 and is passed to the incinerator 42 by fan 15 as described. In this embodiment, the incinerated gaseous products issuing from the exhaust 22 may be directed by change-over dampers 31, 32 either to atmosphere via stack 22a or alternatively back to the oven or similar plant via ducting 45 as return air to the supply side of the heaters 30 and 30a.

In this way, part of the hot incinerated gaseous products may be utilized for oven heating, while maintaining the necessary exhaust quantity to insure adequate oven ventilation.

During the starting cycle of the plant, the changeover dampers 31, 32 may direct the exhaust gases to atmosphere thus purging the whole system before the burners in the combustion chamber are ignited. At completion of the purging cycle, the change-over dampers 31 may then move to direct part of the incinerated gaseous products into line 45 and back to the paint bake oven 40 to perform useful heating.

Figure 4:
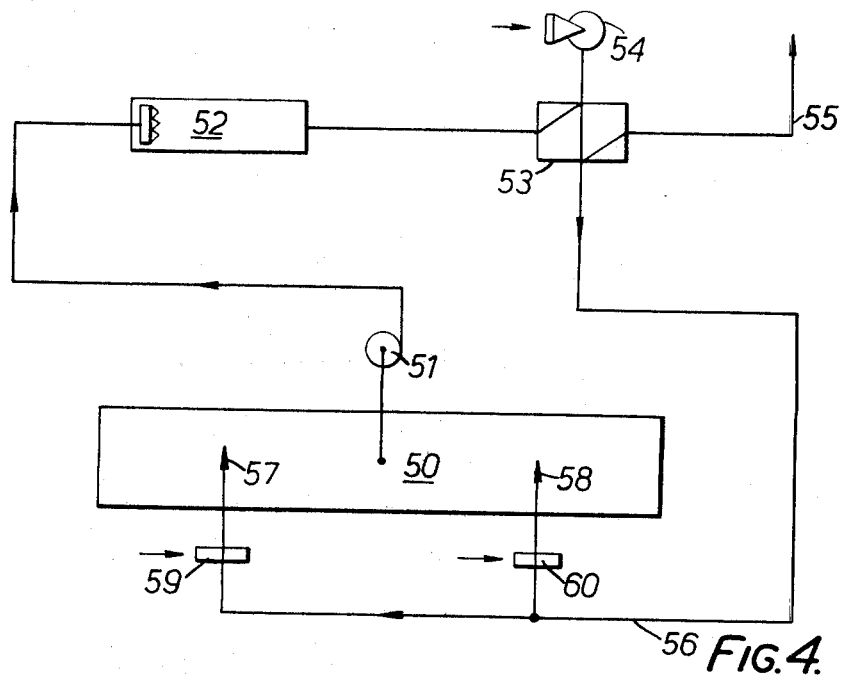
Figure 5:
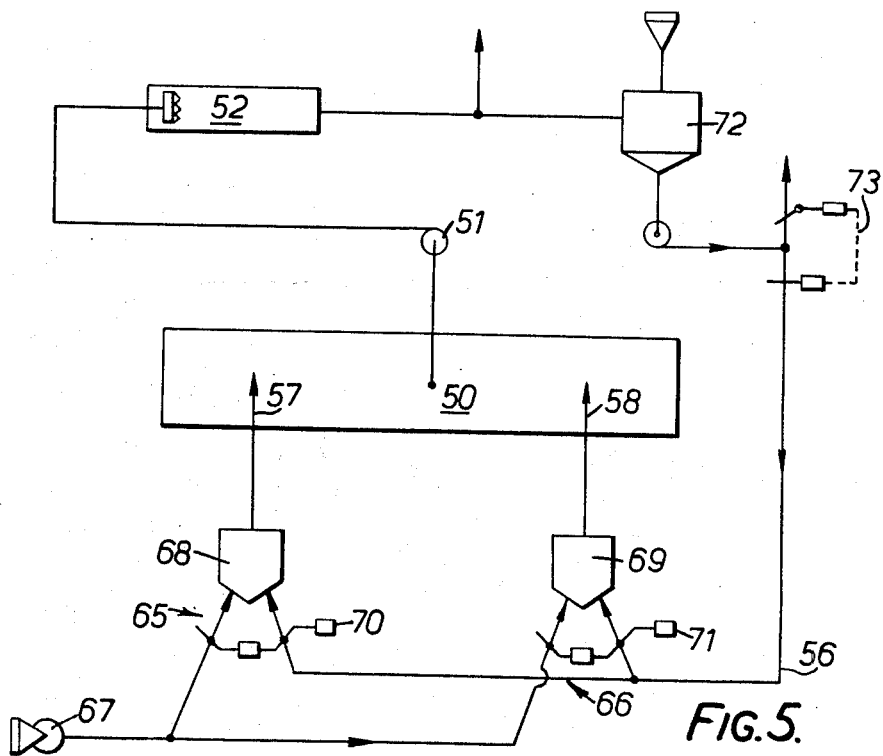

FIGS. 4 and 5 illustrate two further heat-recovery systems according to the invention. FIG. 4 shows a constant volume variable temperature system where effluent air is drawn from the process chamber 50 by an oven exhaust fan 51 and passes to the incinerator 52.

The hot products of combustion from the incinerator are then passed through an indirect heat exchanger 53, to heat fresh air drawn in by fan 54, and the incinerated effluent is then passed to exhaust via duct 55.

The hot air from the heat exchanger flows through a high velocity duct 56 and passes to the two heating zones of the process in the chamber 50 via two inlets 57 and 58.

Before passing into the process chamber, the hot air passes over terminal reheaters 59 and 60 which are controlled to bring the air to the required temperature. These heaters enable individual control of the air flows in the inlet ducts 57 and 58 respectively.

FIG. 5 shows a similar system to that shown in FIG. 4 and provides variable temperature air at a constant quantity through a dual duct mixing arrangement 65 and 66 which replaces the terminal reheaters of FIG. 4. Fresh air is drawn in by the fan 67 and is mixed with the hot gas flowing through duct 56 in air mixing boxes or direct heat exchangers 68 and 69. The mixed gases are then passed to the process 50.

The temperature at the two inlets 57 and 58 is separately controlled by the volume of fresh air mixed in the heat exchangers 68 and 69; this volume is controlled in turn by the operation of the fan 67 and dampers 70 and 71. The advantage of this system is that the temperature of the incoming air may be controlled without altering the quantity supplied to the process chamber. The apparatus shown in FIG. 5 is provided with a direct heat exchanger or mixer 72 in place of the indirect heat exchanger 53 shown in FIG. 4. The heated gas passing to the process chamber 50 through duct 56 is therefore a mixture of the burnt effluent from the combustion chamber 52 and fresh air. A spill valve 73 is also provided.

It will be understood that in any of the above apparatus, a direct or indirect heat exchanger may be employed, depending on the use for which the heated gas for the process is intended.

Figure 6:
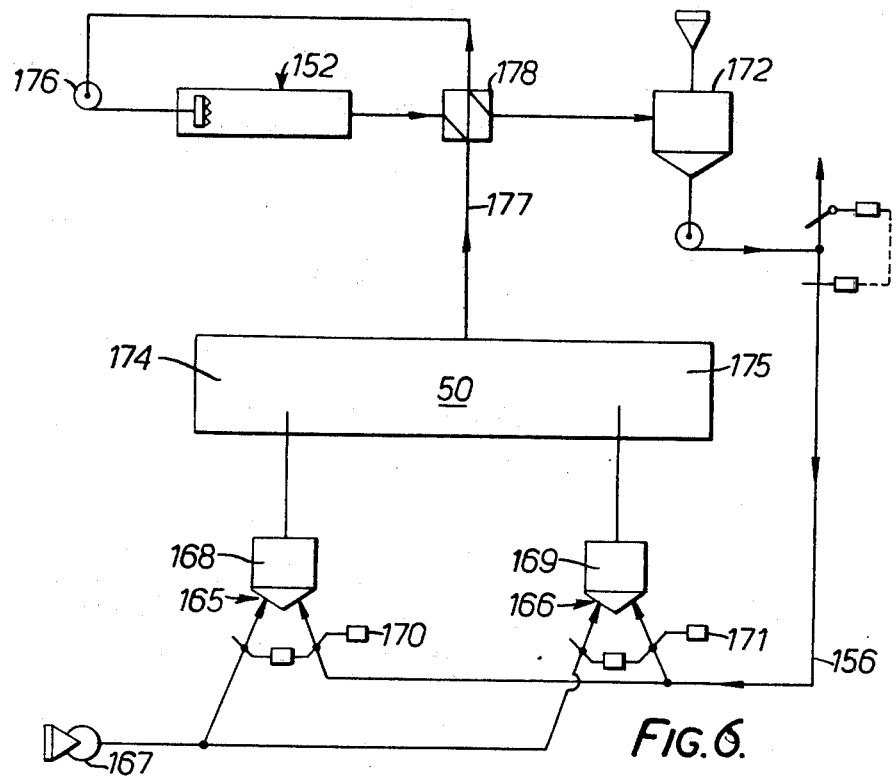
Figure 7:
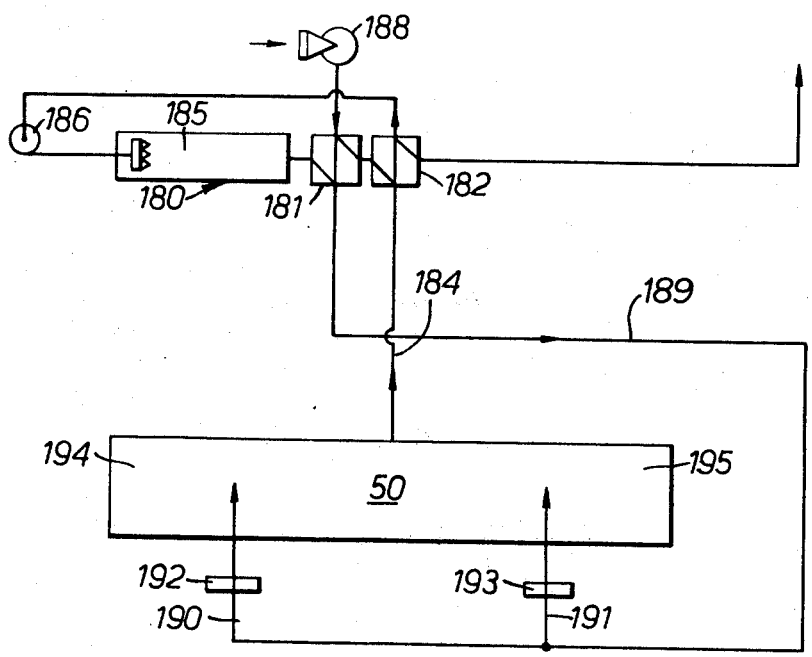

Two further embodiments of heat recovery systems according to the invention are illustrated in FIGS. 6 and 7.

FIG. 6 illustrates a system basically similar to that shown in FIG. 5, and adapted to provide variable temperature air at constant quantity through a dual duct mixing arrangement 165 and 166. Fresh air drawn in by fan 167 is mixed with the hot gas/air mixture flowing through line 156 in the air mixing boxes 168 and 169. These mixing boxes are fitted with controls 170 and 171 which allow the flow of air into the two heating zones 174 and 175 to be individually controlled.

The embodiment of FIG. 6 differs from that shown in FIG. 5 in that it is provided with a preheater 178 for the effluent from the process 50. This preheater is incorporated in the incinerator module 152 (as shown for example in FIG. 1) and consists of an indirect heat exchanger located in the exhaust duct from the combustion chamber. The effluent is drawn from the process 50 by a fan 176 via ducting 177.

FIG. 7 illustrates a heat recovery system utilising the incinerator module illustrated in FIG. 1 to provide preheating of the gaseous effluent and to supply heated air to two heating zones in the process 50.

In this embodiment, two heat exchangers 181 and 182 are utilised in the incinerator module 180. Heat exchanger 182 is a preheater for the gaseous effluent which is drawn through duct 184 to the combustion chamber 185 by a fan 186. The exhaust from the combustion chamber is passed to exhaust through heat exchanger 181, in which it heats fresh air drawn in by fan 188.

The heated air from the heat exchanger 181 is passed through duct 189 and divided into two separate supplies in ducts 190 and 191, which feed separate heating zones 194 and 195 in the process 50. Individual control of these supplies is accomplished by terminal reheaters 192 and 193 located across the supply ducts.

Figure 8:
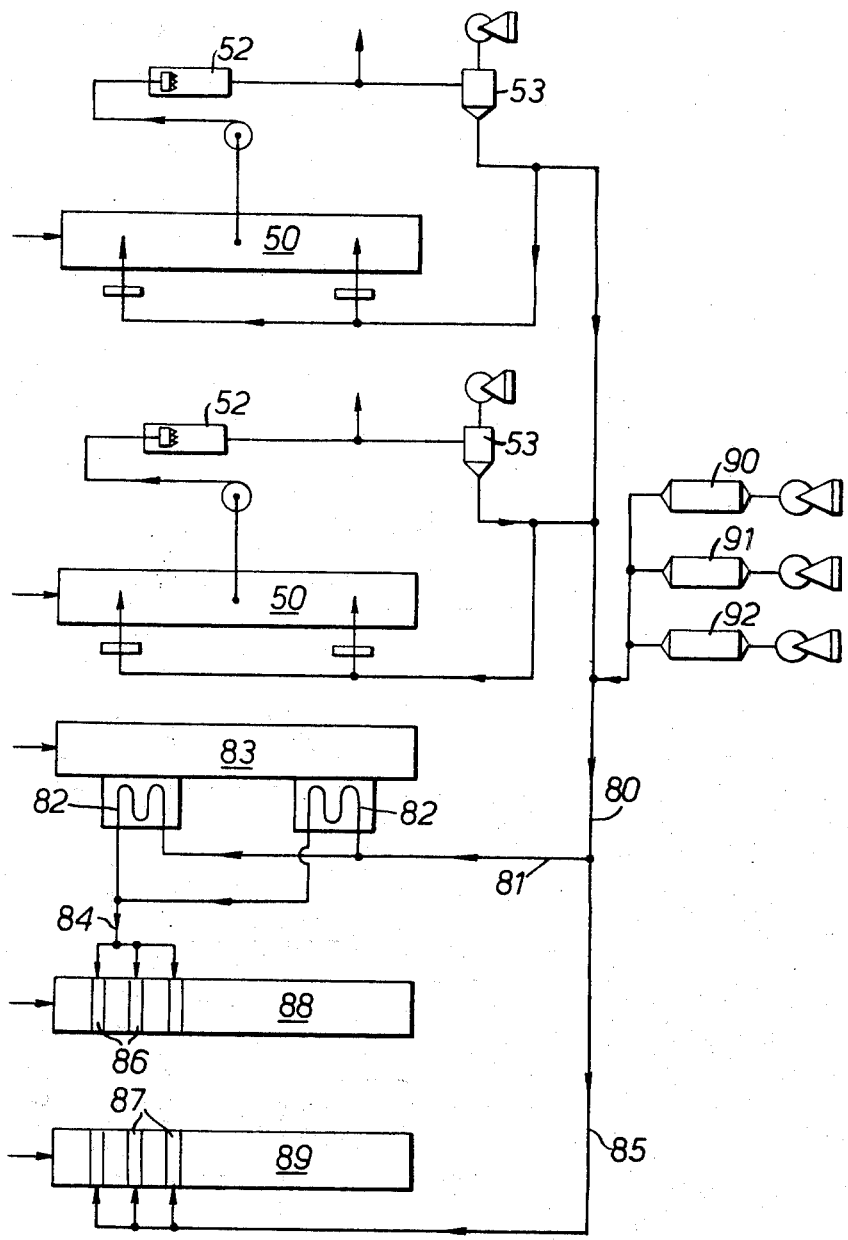

Apparatus adapted to provide a complete heat recovery system with further process heating is shown in FIG. 8. The two process chambers 50 are supplied with a heated gas from the direct heat exchangers 53 as described above, and excess heat not used in the two process chambers 50 passes into duct 80. A proportion of the air from duct 80 passes down duct 81 and through heat transfer tubes 82 where it is used to heat a solution in process chamber 83. The remainder of the hot gases, passing through lines 84 and 85, are passed through air mixing rings 86 and 87 in the air heating apparatus 88 and 89 respectively. This air may then be used for work-shop heating, for example.

Back up heaters 90, 91 and 92 are provided to supplement the supply of hot air in peak periods; these heaters may be switched into the circuit individually when required.

The processes described above may include process drying equipment, paint baking equipment, solution heating equipment, and air and water heating equipment. It can be seen that complete process heating including air pollution control as described above will cost substantially the same as a conventionally heated process, without the treatment of effluent. In addition, the plant operating and running costs may be dramatically reduced compared with a conventional system using independent air heaters, and/or process heaters. It is a significant advantage of the heat recovery systems described that the recovered heat may be easily redistributed about the process oven or heating network to meet changes in process heat requirements at no extra cost. This is not possible with known heat recovery apparatus which do not offer the possibility of load sharing.

In order to minimise heat loss in the recovery systems according to the invention, relatively small diameter ducting is used throughout together with high gas temperatures and velocities in the ducting. For example, ducting of between 18 inches and 30 inches may be used with gas flowing at velocities of between 3000 and 8000 ft/min. at temperatures between 750 and 950°F. This obviates the necessity for expensive and uneconomic lagging. Thermal losses are further reduced compared to known processes due to the ability of the system to operate without indirect heat exchangers at the individual heating zones. Any indirect heat exchangers used in the system are incorporated into the combustion chamber module as described.

Figure 9:
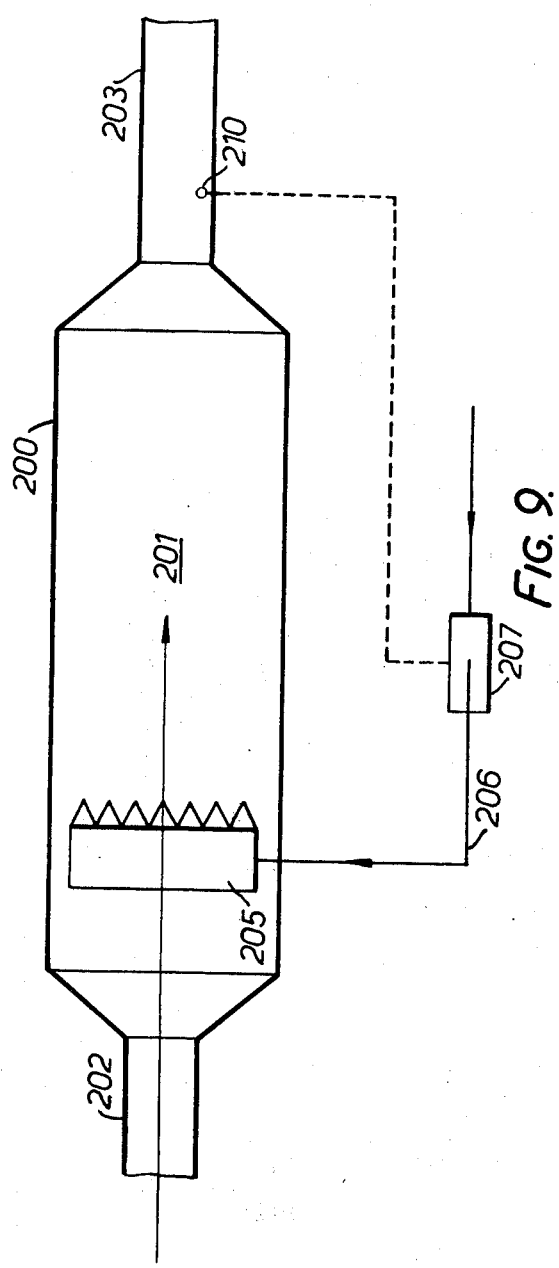
FIG. 9 is a diagrammatic sectional view of a terminal reheater for use in a heat recovery system according to the invention.

FIG. 9 illustrates in diagrammatic form, a terminal reheater for use in a heat recovery system according to the invention where it is required to raise the temperature of the gas passing to a heating zone, as in FIGS. 3, 4 and 7.

The reheater comprises walls 200 defining a heating chamber 201 located across a supply duct leading to a heating zone. The reheater is provided with a gas inlet 202 for the hot air or air/gas mixture, and a gas outlet 203 communicating with the heating zone. A burner 205 is located in the chamber 201 such that the gas from the inlet 202 passes over the burner as it flows through the heating chamber, thereby raising the temperature of the gas passing to the heating zone.

The burner 205 may in fact be any suitable heating means such as a direct fired or indirect fired fuel burner (e.g. a gas or oil burner) or alternatively may be a heater battery utilising electricity or steam. In this embodiment, the burner is a direct fired gas burner supplied with fuel through line 206 and having burner controls 207. These burner controls are linked to a thermostat device 210 located in the gas outlet 203 which can if necessary control the operation of the burner to maintain the temperature of the hot gas flowing to the heating zone at a given level. In addition, the nature of the burner and its controls allow the temperature of the gas feed to the heating zone to be quickly, easily, and if necessary finely, adjusted to meet changing heat load requirements in the process. It will be appreciated that the simple design of the terminal reheater results in very low manufacturing and installation costs which is most important where a large number of heating zones are to be supplied. It will also be appreciated that the quantity of air passing through the terminal reheater remains constant in the absence of any additional control; as the burner is adapted to add heat only to the gas as it passes through the chamber 201, the weight of gas passing to the heating zone remains constant.

FIG. 10 illustrates diagrammatically an air mixing box for use in a heat recovery system according to the invention where it is necessary to lower the temperature of the hot gas supplied to a heating zone, as in FIGS. 5 and 6. The mixing box comprises a mixing chamber 220 defined by walls 221 and located across a supply duct to a heating zone. The chamber 220 has a fresh air inlet duct 223 supplied by a fan (shown for example in FIG. 6), a hot gas inlet duct 224 and a gas outlet duct 225 communicating with the heating zone.

The flow of hot gas into the mixing chamber is controlled by a damper 227 located in the inlet duct 224, and the flow of cold air is controlled in a similar fashion by means of a damper 228 located in air inlet duct 223.

Movement of damper 227 is initiated by control means 229 which is operatively connected to a pressure sensor 232 located in the exhaust duct 225; movement of damper 228 is operated by control means 230 connected to a thermostat or temperature sensor 233, also in duct 225. With the controls described, the temperature of the hot gas passing to the heating zone is controlled by varying the amount of fresh air admitted to the mixing chamber 220. In addition, the actual weight of air flowing into the heating zone is measured by the pressure sensor 232 and may be held constant by varying the amount of hot gas flowing through the inlet duct 224 by varying the position of damper 227.

The terminal reheater and the air mixing box described above are thus each able to perform an essential part of the system in that they are able to vary the temperature of the hot gas flowing to the heating zones without altering the air or gas balance.

As previously stated, this is essential with some processes. They are also able to provide fine control of the temperature of the heated gas and are both simple to operate and cheap to construct and to install. In addition, they are capable of operating at the high temperatures and gas velocities of the heat recovery system of the invention.

I claim:

1. A heat recovery system for an industrial process which process produces a combustible gaseous effluent as a by-product and said process having at least two inlets for heated gas supplied by the heat recovery system and an exhaust duct for said effluent, said heat recovery system comprising a combustion chamber, a direct ignition device located in the combustion chamber, an inlet duct connected to said exhaust duct and leading into the combustion chamber, a fan in said inlet duct for causing the effluent to flow through the combustion chamber and over the direct ignition device, a further exhaust duct for the burnt effluent and leading out of the combustion chamber, a first heat exchanger in communication with said exhaust duct, said heat exchanger having a fresh air inlet and at least part of the burnt effluent being passed in heat exchange relationship with air passing through said fresh air inlet, at least two supply ducts in communication with the first heat exchanger and connected respectively to said two inlets in the process for supplying heated gas from said heat exchanger respectively to said two inlets in the industrial process, temperature control means located across each supply duct for individually controlling the temperature of the heated gas in the respective supply ducts and for maintaining a constant weight of heated gas flowing through each supply duct into the process, and a preheater for the unburnt effluent in the form of an indirect, second heat exchanger located in the further exhaust duct from said combustion chamber, the unburnt effluent passing to the inlet duct of the combustion chamber from the industrial process via said second heat exchanger where it is heated by the burnt effluent passing through said further exhaust duct.

2. A heat recovery system according to claim 1, wherein the temperature control means for the heated gas comprises an air mixing box having walls defining a chamber, a gas inlet in the chamber communicating with the supply duct, a damper located in the gas inlet and adapted to control the flow of heated gas into the chamber, a gas outlet from the chamber communicating with the respective heating zone, ducting communicating with the fresh air inlet, a fan in the ducting operable to draw fresh air at ambient temperature into the chamber for mixing with the heated gas, and a damper located in the ducting and adapted to control the intake of fresh air into the chamber.

3. A heat recovery system according to claim 2, wherein air damper control means are provided for the damper located in the ducting to the fresh air inlet, and temperature sensing means operatively connected to the air damper control means are located in the gas outlet from the chamber, said air damper control means being adapted to vary the flow of fresh air to the chamber as a function of the temperature of the gas flowing through the gas outlet to the heating zone, and wherein gas damper control means are provided for the damper located in the gas inlet and pressure sensing means operatively connected to the gas damper control means are located in the gas outlet from the chamber, said gas damper control means being adapted to vary the flow of heated gas to the chamber as a function of the pressure of the gas flowing through the gas outlet to the heating zone.

4. A heat recovery system according to claim 1, wherein the temperature control means for the heated gas comprises a terminal reheater having walls defining a heating chamber, a gas inlet in the heating chamber communicating with the supply duct, a gas outlet from the heating chamber communicating with the respective heating zone, and a burner located in the heating chamber and operable to supply heat to the gas passing through the heating chamber to the heating zone.

5. A heat recovery system according to claim 4, wherein burner control means are provided for the burner and temperature sensing means operatively connected to the burner control means are located in the gas outlet from the heating chamber, said burner control means being adapted to control the operation of the burner as a function of the temperature of the gas flowing through the gas outlet to the heating zone.

6. Heat recovery apparatus according to claim 1, wherein means are provided for cutting off the flow of unburnt effluent to the combustion chamber and for admitting fresh air thereto to purge the combustion chamber of effluent.

7. A heat recovery system for a process having a combustible gaseous effluent outlet, at least two heated gas inlets which may require heated gas flows of different temperatures and amounts properly to execute the process, and an exhaust fan for educting effluent through said outlet at a rate sufficient to maintain such proper execution of the process, said recovery system comprising, in combination:

a combustion chamber connected to said outlet so as to receive all of said effluent, a direct ignition device in said combustion chamber and a combustion chamber outlet for discharging burnt effluent at an elevated temperature which is greater than that required of said gas flows;

a first heat exchanger connected to said combustion chamber outlet, a fan having a fresh air inlet and discharging to said heat exchanger, said heat exchanger having a heated gas supply outlet and there being stack means for discharging burnt effluent from the system;

conduit means connecting said heated gas supply outlet to said heated gas inlets for providing heated gas flow to said process;

a temperature control means associated with each of said heated gas inlets, each such temperature control means connecting said conduit means to its associated heated gas inlet for controlling the temperature and for maintaining a constant weight of heated gas flow entering the process through such associated heated gas inlet, each temperature control means being independent to balance the flows of heated gas entering the process with the flow of effluent from the process whereby said effluent is educted at said rate maintaining proper execution of the process; and a preheater for the unburnt effluent in the form of an indirect second heat exchanger located in said combustion chamber outlet, the unburnt effluent passing to said combustion chamber from the process via said indirect heat exchanger where it is heated by the burnt effluent passing into said combustion chamber.

8. A heat exchange system as defined in claim 7 wherein said heat exchanger effects mixing of said fresh air with at least a portion of said first burnt effluent and each temperature control means is in the form of a mixing device and includes means for controllably mixing fresh air with the heated gas flowing to its associated heated gas inlet and means for controlling the amount of heated gas flowing to the mixing device through its associated heated gas inlet.

9. A heat exchange system as defined in claim 7 wherein said first heat exchanger effects indirect heat exchange between said fresh air and burnt effluent and each temperature control means includes a burner and temperature control means controlling such burner.

* * * * *